(12) United States Patent
Zaks et al.

(10) Patent No.: US 7,627,700 B2
(45) Date of Patent: Dec. 1, 2009

(54) EXPANDED MEMORY FOR COMMUNICATIONS CONTROLLER

(75) Inventors: Artur Zaks, Modin (IL); Oran Gurewitz, Hod Hashron (IL)

(73) Assignee: Texas Instruments Incorporated, Dallas, TX (US)

(*) Notice: Subject to any disclaimer, the term of this patent is extended or adjusted under 35 U.S.C. 154(b) by 107 days.

(21) Appl. No.: 11/758,313

(22) Filed: Jun. 5, 2007

(65) Prior Publication Data

US 2008/0307132 A1  Dec. 11, 2008

(51) Int. Cl.
*G06F 13/10* (2006.01)
*G06F 13/28* (2006.01)
*G06F 13/42* (2006.01)

(52) U.S. Cl. .............. 710/35; 710/33; 710/74; 710/106; 710/315

(58) Field of Classification Search .............. None
See application file for complete search history.

(56) References Cited

U.S. PATENT DOCUMENTS

| | | | |
|---|---|---|---|
| 5,764,896 A * | 6/1998 | Johnson ............. | 709/250 |
| 6,247,084 B1 | 6/2001 | Apostol, Jr. et al. | |
| 6,298,370 B1 | 10/2001 | Tang et al. | |
| 6,526,464 B1 | 2/2003 | Jobs et al. | |
| 6,611,537 B1 | 8/2003 | Edens et al. | |
| 6,622,188 B1 | 9/2003 | Goodwin et al. | |
| 6,789,030 B1 | 9/2004 | Coyle et al. | |
| 6,816,750 B1 | 11/2004 | Klaas | |
| 7,028,215 B2 | 4/2006 | Depew et al. | |
| 7,031,401 B2 | 4/2006 | Lambert | |
| 7,039,918 B2 | 5/2006 | Jones et al. | |
| 7,072,975 B2 | 7/2006 | Kato | |
| 7,133,416 B1 | 11/2006 | Chamdani et al. | |
| 7,158,525 B2 | 1/2007 | Daffner et al. | |
| 2003/0210686 A1 | 11/2003 | Terrell et al. | |
| 2005/0213392 A1* | 9/2005 | Ganton ............. | 365/185.29 |
| 2006/0069905 A1* | 3/2006 | Moriwaki et al. ......... | 713/1 |
| 2006/0242437 A1 | 10/2006 | Jovanovich | |
| 2007/0016308 A1* | 1/2007 | Kusumi et al. ......... | 700/4 |
| 2007/0038516 A1 | 2/2007 | Apple et al. | |

* cited by examiner

*Primary Examiner*—Ilwoo Park
(74) *Attorney, Agent, or Firm*—Steven A. Shaw; W. James Brady; Frederick J. Telecky, Jr.

(57) ABSTRACT

One embodiment of the present invention includes a communication system. The system comprises a communications controller configured to control transmission and reception of communications data in a network. The system also comprises a memory configured to store configuration data associated with the communications controller and application parameters associated with each of a plurality of communications applications. The system further comprises an interface converter interconnecting the communications controller and the memory and configured to convert a first bus interface protocol associated with the communications controller to a second bus interface protocol for providing read and write data transfer of the configuration data and the application parameters between the communications controller and the memory.

14 Claims, 3 Drawing Sheets

EXPANDED MEMORY FOR COMMUNICATIONS CONTROLLER

TECHNICAL FIELD

This invention relates to electronic circuits, and mote specifically to expanded memory for a communications controller.

BACKGROUND

There is an ever increasing demand for electronic devices to operate with increased efficiency and greater operational speed. As an example, communication devices that are utilized in a wireless local area network (WLAN) can be configured to control transmission and reception of data in a manner that maximizes bandwidth. Such devices can include a communications controller, such as a media access control (MAC) processor, that is configured to control the data flow between a variety of other communication devices in the WLAN via communications applications. Each communications controller may require different configuration data, such as calibration data and/or predetermined information to be written to MAC-layer and/or physical (PHY)-layer registers, that is loaded upon startup and/or reset of the communications controller.

The configuration data of a given communications controller is typically stored in a serial electrically erasable programmable read-only memory (EEPROM) accessible by the communications controller. The serial EEPROM may be accessed by the communications controller via a bus interface protocol, such as inter-integrated circuit ($I^2C$) protocol, such that the communications controller may store the configuration data in a local memory, such as a static random access memory (SRAM) or cache memory. The local memory may also be configured to store application parameters associated with the communications applications with any of a variety of other communication devices on the WLAN. However, the local memory in the communications controller may have limited storage capacity, thus limiting the number of communications applications that can be performed by the communications controller. In addition, repeatedly accessing the local memory for each communications application may require a substantial amount of processing utilization, and may block operation of other components of the communication device, such as a radio frequency (RF) interface. As a result, the performance of the communications controller may be substantially affected upon switching between communications applications, and the WLAN may experience undesirable delays in data transfer between one or more communication devices.

SUMMARY

One embodiment of the present invention includes a communication system. The system comprises a communications controller configured to control transmission and reception of communications data in a network. The system also comprises a memory configured to store configuration data associated with the communications controller and application parameters associated with each of a plurality of communications applications. The system further comprises an interface converter interconnecting the communications controller and the memory and configured to convert a first bus interface protocol associated with the communications controller to a second bus interface protocol for providing read and write data transfer of the configuration data and the application parameters between the communications controller and the memory.

Another embodiment of the present invention includes a method for accessing memory. The method comprises transmitting a plurality of consecutive data blocks from a communications controller on a first data bus via inter-integrated circuit ($I^2C$) protocol. The method also comprises converting the $I^2C$ protocol to a second bus interface protocol for transmission of the plurality of consecutive data blocks on a second data bus. The method further comprises storing the plurality of consecutive data blocks in the memory device via the second data bus.

Another embodiment of the present invention includes a communication system. The communication system comprises means for controlling transmission and reception of communications data in a network. The communication system also comprises means for storing configuration data associated with the means for controlling and for storing application parameters associated with each of a plurality of communications applications. The system also comprises means for converting a first bus interface protocol associated with the means for controlling to a second bus interface protocol for providing read data transfer of the configuration data and the application parameters from the means for storing to the means for controlling and write data transfer of the application parameters from the means for controlling to the means for storing.

DETAILED DESCRIPTION

The present invention relates to electronic circuits, and more specifically to expanded memory for a communications controller. A communication system in a network may include an interface converter between the communications controller and an external memory. The interface converter can be configured to convert a serial-bus interface protocol, such as inter-integrated circuit ($I^2C$) protocol, to a second bus interlace protocol that can communicate with any a variety of types of memory. As an example, the external memory can be configured as a flash memory having a substantially greater storage capacity than an electrically erasable programmable read-only memory (EEPROM), as can be implemented in a typical communication system. As a result, the communications controller can be configured to access application parameters associated with each of a plurality of communications applications, aid can further be configured to write application parameters associated with the communications applications to the external memory. As such, the application parameters can be subsequently accessed and implemented upon returning to a given one of the communications applications. Furthermore, the transfer of data between the communications controller and the external memory can be provided as a burst read operation and a burst write operation, such that the transfer of data can be performed with low utilization of processing resources of the communications controller. Therefore, the communication system may operate more efficiently.

Figure 1:
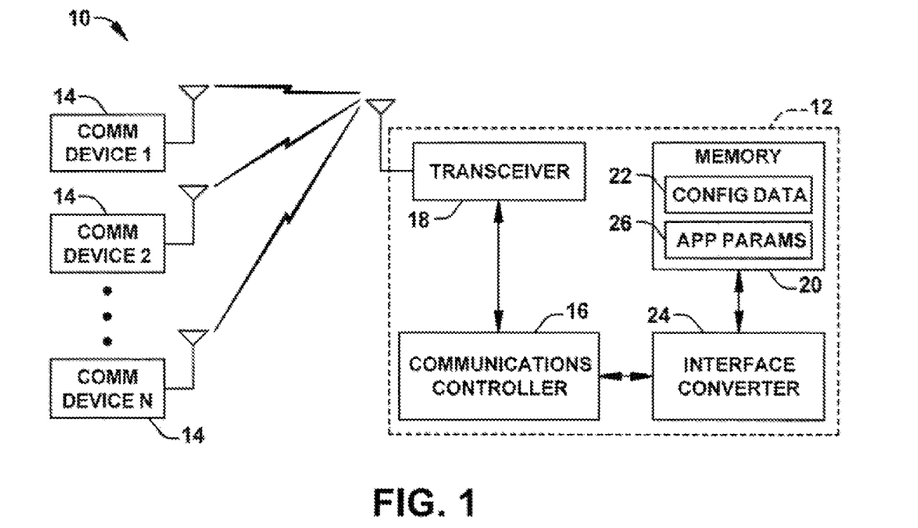
FIG. 1 illustrates an example of a network in accordance with an aspect of the invention.

FIG. 1 illustrates an example of a network 10 in accordance with an aspect of the invention. The network 10 is demonstrated in the example of FIG. 1 as a wireless local area network (WLAN). The network 10 includes a first communication device 12 which could be, for example, a wireless router or modem. The first communication device 12 is configured to wirelessly communicate with each of a plurality of additional communication devices 14, labeled in the example of FIG. 1 as COMM DEVICE 1 through COMM DEVICE N, where N is a positive integer. The additional communication devices 14 can likewise include any of a variety of wireless communication devices, such as routers and/or modems.

The first communication device 12 includes a communications controller 16 and a transceiver 18. The communications controller 16 is configured to direct the transmission and reception of communications data between the first communications device 12 and one or more of the additional communication devices 14 via the transceiver 18. As an example, the communications controller 16 can provide commands to the transceiver 18 that correspond to communication parameters for a given communications application, such that the transceiver 18 can be tuned to transmit data to and/or receive data from the one or more of the additional communication devices 14. For example, the communications controller 16 can assign a transmission frequency, time slots, and/or set any of a variety of other communication settings for the transmission and reception of data to the transceiver 18 as defined for the given communications application. As described herein, a communications application is defined as a communication session between the first communication device 12 and a specific one or more of the additional communication devices 14. As such, a communications application of the first communication device 12 can include receiving data from one of the additional communication devices 14 and/or transmitting data to any combination of the additional communication devices 14 at a given time.

The first communications device 12 also includes a memory 20, which could be a flash memory or any of a variety of types of random access memory (RAM). The memory 20 can be configured to store configuration data 22 for the communications controller 16, the configuration data 22 being demonstrated in the example of FIG. 1 as CONFIG DATA. For example, upon a startup or a reset of the communications controller 16, the communications controller 16 can be configured to access the configuration data 22 from the memory 20 and to read the configuration data 22 to a local memory space within the communications controller 16, such as within a cache memory. As an example, the configuration, data 22 can include initialization data that is implemented to calibrate the communications controller 16 within the network 10, such as including a media access control (MAC) address for the communications controller 16 and/or other data that can be written to registers in the MAC-layer and/or the physical (PHY)-layer of the communications controller 16.

The communications controller 16 can be configured to access the configuration data 22 via a built-in data bus interface protocol, which can be a serial-bus interface protocol, such as inter-integrated circuit ($I^2C$) protocol. Thus, the communications controller 16 can access the configuration data 22 via a serial burst read operation, such that the configuration data 22 can be accessed as consecutive data blocks that are stored in consecutive address spaces within the local memory of the communications controller 16. Each of the consecutive data blocks can be a predetermined amount of data, such as 1 kilobyte. Accordingly, upon receiving the configuration data 22, the communications controller 16 can establish itself as a communications node on the network 10, such that it can begin communications applications with one or more of the additional communication devices 14 via the transceiver 18.

Because the memory 20 can be configured as a flash memory or other type of RAM, the memory 20 may not be configured to communicate via the built-in data bus interface protocol of the communications controller 16. As an example, a flash memory can be configured to communicate via a parallel-bus interface protocol for a more rapid read/write access. As a result, the first communication device 12 can include an interface converter 24 that is configured to convert the built-in data bus interface protocol to a second bus interface protocol. As an example, the interface converter 24 can be configured to convert $I^2C$ protocol to a parallel-bus interlace protocol. Therefore, the communications controller 16 can generate memory access commands, such as a burst read data transfer command, via the built-in data bus interface protocol for reading data from and writing data to the memory 20 via a different bus interface protocol. As a result, the type and size of the memory 20 can be flexibly configured within the first communication device 12 without modifying the memory access configuration of the communications controller 16.

Due to the memory 20 being flexibly configured in the first communication device 12, an amount of available memory and memory access capability can be significantly expanded. For example, a memory 20 that is configured with memory access via a serial-bus interface protocol, such as $I^2C$ protocol, may be implemented as an electrically erasable programmable read-only memory (EEPROM), which has limitations associated with both memory capacity and write access. However, by converting the serial-bus interface protocol to a different bus interface protocol via the interface converter 24, the memory 20, such as a flash memory, can include significantly more memory capacity and can be configured to store data output from the communications controller 16. As a result, the communications controller 16 can utilize the memory 20 as an expanded local memory.

The memory 20 includes application parameters 26, demonstrated in the example of FIG. 1 as APP PARAMS. The application parameters 26 can be data that includes a set of variables and process states corresponding to a specific one of the communications applications between the first communication device 12 and one or more of the additional communications devices 14, such that the communications controller 16 can dictate the appropriate communication commands to the transceiver 18. The application parameters 26 can be generated and/or modified by the communications controller 16 during the corresponding communications application, and can thus be written to the memory 20 by the communications controller 16 via the interface converter 24 upon the conclusion of the specific communications application. As an example, the communications controller 16 can provide a burst write data transfer command, such that the application parameters 26 can be transferred as consecutive data blocks that are stored in consecutive address spaces within the memory 20. Therefore, upon returning to the specific communications application, the communications controller 16 can read the corresponding application parameters 26 from the memory 20 via the interface converter 24 to resume communications between the first communication device 12 and the appropriate one or more of the additional communication devices 14.

It is to be understood that the network 10 is not intended to be limited to the example of FIG. 1. As an example, the network 10 is not intended to be limited to a WLAN, as demonstrated in the example of FIG. 1, but could instead be implemented in a wired LAN or a LAN having a combination of wired and wireless connections. In addition, the first wireless device 12 can include any of a variety of additional components that have not been described in the example of FIG. 1 for the sake of simplicity. Therefore, the network 10 can be configured in any of a variety of ways in the example of FIG. 1.

Figure 2:
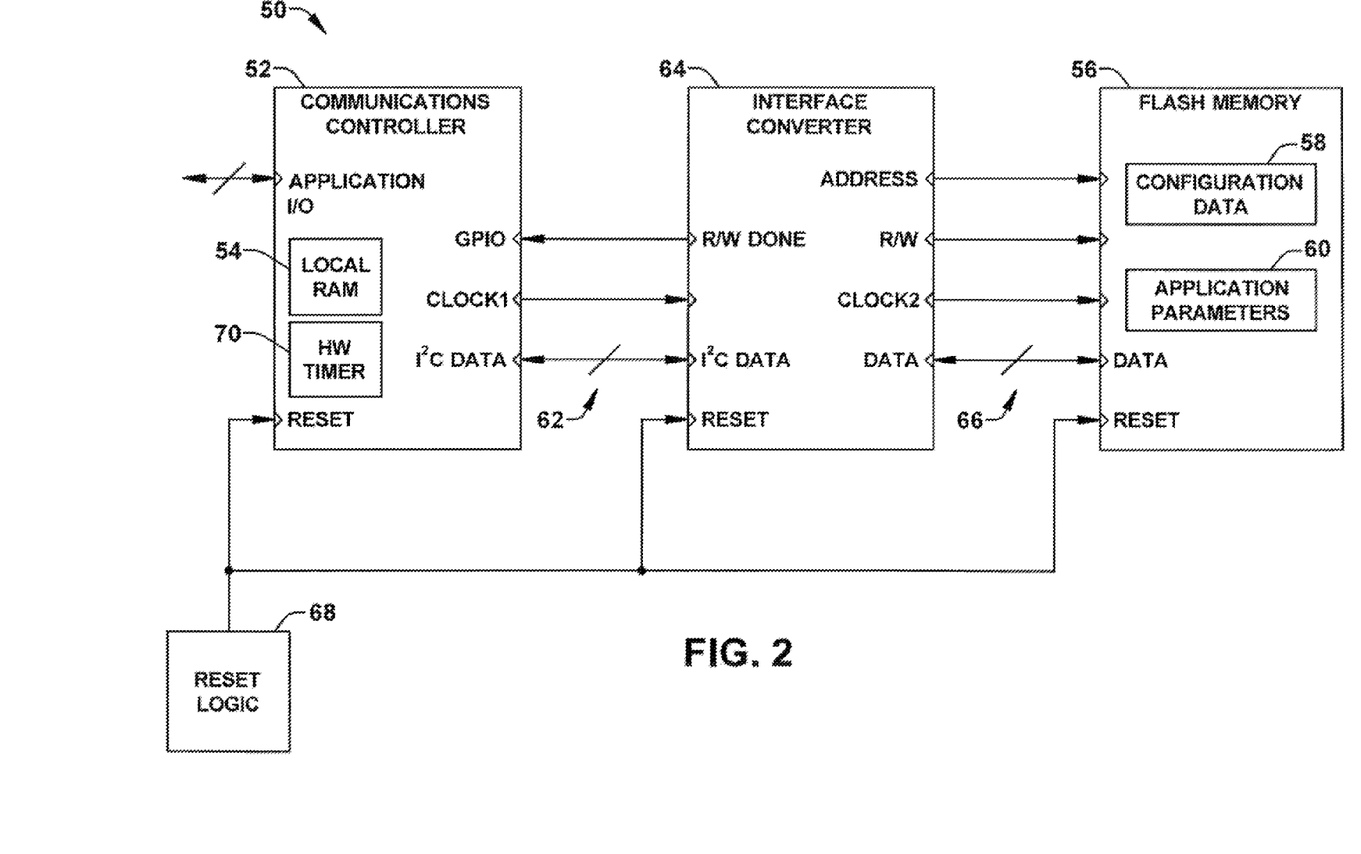
FIG. 2 illustrates an example of a communication system in accordance with an aspect of the invention.

FIG. 2 illustrates an example of a communication system 50 in accordance with an aspect of the invention. The communication system 50 can be implemented in the first communication device 12 in the example of FIG. 1. As such, reference is to be made to the example of FIG. 1 in the description of the example of FIG. 2.

The communication system 50 includes a communications controller 52. The communications controller 52 can be configured as a communications processor or similar integrated circuit (IC) configured to direct the transmission and reception of communications data between a communication device in which the communication system 50 is implemented and one or more additional communication devices via a transceiver (not shown). As an example, the communications controller 52 can provide communication commands to a transceiver that correspond to communication parameters for a given communications application, and can also receive communication status information, such as handshaking information, from the transceiver. Such communication commands and communication status information are demonstrated in the example of FIG. 2 as APPLICATION I/O, which could correspond to one or more separate pins on the communications controller 52.

The communications controller 52 includes a local RAM 54 that can be configured, for example, as a cache memory. As an example, the local RAM 54 can be configured to store configuration data for operation of a communication device that includes the communication system 50 within a network. The local RAM 54 can also be configured as temporary storage for application parameters that support a communications application with one or more additional communication devices on the network.

The communication system 50 also includes a flash memory 56. The flash memory 56 can be configured to store configuration data 58 associated with the communications controller 52 and application parameters 60. The configuration data 58 can include initialization data that is implemented to calibrate the communications controller 52 within the network in which the communication system 50 is designed to operate. As an example, the configuration data 58 can include a MAC address for the communications controller 52 and initialization and calibration data that is written to address registers in the MAC-layer and the PHY-layer of the communications controller 52. The configuration data 58 can be read from the flash memory 56 by the communications controller 52 upon any of a variety of initialization events. For example, upon a reset of the communication system 50, or a startup of the communication system 50 via application of power, the communication controller 52 can initiate a read command to read the configuration data 58 from the flash memory 56, as described in greater detail below.

The communications controller 52 includes an $I^2C$ data interface configured to communicate on a serial-bus 62. The communications controller 52 can implement the $I^2C$ data interface to read the configuration data 58 and the application parameters 60 from the flash memory 56, as well as write the application parameters 60 from the flash memory 56. However, because the flash memory 56 may not be configured to communicate data via a serial-bus interface protocol, the communication system 50 includes an interface converter 64, which can be configured as an IC separate from the communications controller 52, that interconnects the communications controller 52 and the flash memory 56. Therefore, the interface converter 64 is configured to convert the $I^2C$ protocol to a second bus interface protocol, such as parallel-bus interface protocol, configured to communicate on a second data bus 66. Accordingly, the communications controller 52 can access the configuration data 58 and the application parameters 60 in the flash memory 56 using the $I^2C$ data interface via the serial-bus 62 and the second data bus 66 through the interface converter 64.

As an example, the communications controller 52 may initiate a data read from the flash memory 56. The interface converter 64 includes a read/write output R/W and an address pointer output, demonstrated as ADDRESS in the example of FIG. 2, that can access specific byte addresses within the flash memory 56 based on memory access commands from the communications controller 52. Therefore, the interface converter 64 can assert a read operation via the R/W output to access and read specific data bytes from the flash memory 56, as dictated by the address pointer ADDRESS, via the second data bus 66, through the interface converter 64, and via the serial-bus 62.

As an example, the communications controller 52 can read data from the flash memory 56 on a byte-by-byte basis, such as by incrementing the byte address based on the address pointer ADDRESS. However, such memory access from the flash memory 56 can be time consuming and can require high utilization of the processing resources of the communications controller 52. Therefore, the address pointer ADDRESS can be implemented by the interface converter 64 to set a starting byte address for a burst read operation based on a command from the communications controller 52. Therefore, the interlace converter 64 can access consecutive address registers in the flash memory 56 to transfer associated consecutive data blocks from the flash memory 56 to the communications controller 52 via the second data bus 66 and the serial-bus 62. The consecutive data blocks can be stored in consecutive address registers in the local RAM 54 of the communications controller 52, and can overwrite existing data that was stored in the consecutive address registers. As a result, data can be read from the flash memory 56 significantly faster and with significantly less processor utilization with a burst read operation.

In the example of FIG. 2, the communication system 50 includes reset logic 68. The reset logic 68 can be configured to initiate a burst read operation of the configuration data 58 from the flash memory 56. For example, the reset logic 68, upon startup or a hardware reset of the communication system 50, can provide a reset signal to a reset pin RESET on each of the communications controller 52, interface converter 64, and flash memory 56. Upon receiving the reset signal, the communications controller 52 cars be configured to immediately initiate a burst read operation of the configuration data 58. The interface converter 64, upon receiving the reset signal, is configured to set the address pointer ADDRESS to a starting byte address of me configuration data 58. The flash memory 56, upon receiving the reset signal, is set for a read operation. Therefore, the configuration data 58 is read from the flash memory 56 in a burst read operation, such that consecutive data blocks are transmitted across the second data bus 66 in the second bus interface protocol to the interface converter 64, and across the serial-bus 62 in the $I^2C$ protocol to the communications controller 52. Accordingly, the communications controller 52 can be calibrated with the appropriate information to participate in communications with additional devices on a WLAN network.

In addition to reading the configuration data 58 from the flash memory 56 via the interface converter 64, the communications controller 52 can also read the application parameters 60 from the flash memory 56 via the interface converter 64. The application parameters 60 can be data that includes a set of variables and process states corresponding to specific communications applications of the communications controller 52 associated with communication links to specific other communication devices on the wireless network. The communications controller 52 can thus provide appropriate communication commands to the associated transceiver to implement the specific communications application. The application parameters 52 can be read from the flash memory 56 on a byte-by-byte basis by repeated adjustment of the address pointer ADDRESS, or in a burst read operation, similar to as described above for the configuration data 58, except that the burst read of the application parameters 60 may not be in response to receiving the reset signal from the reset logic 68.

The communications controller 52, upon receiving the consecutive data blocks of the application parameters 60 from the serial-bus 62 via I$^2$C protocol, can store the application parameters 60 in consecutive data registers in the local RAM 54. In addition, the communications controller 52 can overwrite existing data in the consecutive data registers in the local RAM 54 with the application parameters 60 received during the burst read operation. Therefore, the communications controller 52 can reuse the memory capacity of the local RAM 54, and can maintain consistency in accessing the application parameters 60 from the local RAM 54 from one communications application to the next.

During the course of implementing a given communications application, variables and process states of the application parameters associated with the given communications application may change. The communications controller 52 may thus write the application parameters 60 associated with the given communications application back to the flash memory 56 via the interface converter 64 upon concluding the given communications application and switching to another. Therefore, the communications controller 52 can switch back to the given communications application to run the given communications application again at a later time. Thus, the application parameters 60 associated with the given communications application can be read from the flash memory 56 again via the interface converter 64, including the changes that may have occurred in the previous run-time of the communications application. Accordingly, the flash memory 56 can essentially operate as an extension of the local RAM 54, such that the communications controller 52 can quickly modify and access the application parameters 60 with less processing utilization.

The application parameters 60 can be written from the communications controller 52 to the flash memory 56 by transmitting the data to the interface converter 64 on the serial-bus 62 via the I$^2$C protocol, and from the interface converter 64 to the flash memory 56 on the second data bus 66 via the second bus interface protocol. The data write operation can be implemented in a byte-by-byte manner using the address pointer ADDRESS, similar to as described above for the data read operation, or the communications controller 52 can initiate a burst write operation.

As an example, the communications controller 52 can initiate the burst write operation to write the application parameters 60 from the local RAM 54 to the flash memory 56. In response, the interface converter 64 can set the R/W signal to initiate a write operation to the flash memory 56, and can set the beginning destination address of the address registers in the flash memory 56 using the address pointer ADDRESS. Therefore, the communication controller 52 cart write consecutive data blocks of the application parameters 60 from consecutive address registers of the local RAM 54 on the serial-bus 62 to the interface converter 64 via the I$^2$C protocol. The interface converter 64 can thus transmit the consecutive data blocks of the application parameters 60 on the second data bus 66 to consecutive data registers of the flash memory 56 via the second bus interface protocol, starting at the beginning destination address set by the address pointer ADDRESS. Accordingly, the application parameters 60 corresponding to the given communications application can be accessed at a later time to resume communications application associated with wireless communication between the communication device that includes the communication system 50 and one or more additional communication devices.

In burst read and burst write operations, the data that is transmitted between the communications controller 52 and the flash memory 56 can be clocked. In the example of FIG. 2, the transfer of data between the interface converter 64 and the communications controller 52 via the I$^2$C protocol can be based on a first clock signal CLOCK1 output, from the communications controller 52. In a similar manner, the transfer of data between the interface converter 64 and the flash memory 56 in the second bus interface protocol can be based on a second clock signal CLOCK2. The frequency of the second clock signal CLOCK1 can be set based on the frequency of the first clock signal CLOCK1. As a result, the interface converter 64 can be flexibly configured to provide the appropriate data transfer interlace based on any of a variety of frequencies of the I$^2$C protocol (e.g., 10 KHz, 100 KHz, 1 MHz, or 40 MHz).

As an example, the second clock signal CLOCK2 can have a frequency based on the second bus interlace protocol that is commensurate with a bandwidth of the I$^2$C protocol relative to the first clock signal CLOCK1. Specifically, the frequency of the first clock signal CLOCK1 and the frequency of the second clock signal CLOCK2 can each be set such that the speed at which data is transmitted between the communications controller 52 and the interface converter 64 is approximately equal to the speed at which data is transmitted between the interface converter 64 and the flash memory 56. For example, if the second bus interface protocol is a parallel-bus interface protocol having a higher bandwidth than the I$^2$C protocol, the frequency of the second clock signal CLOCK2 can be set less than the frequency of the first clock signal CLOCK1. As another example, the interface converter 64 can include memory buffers, such that the bandwidth of the second bus interface protocol is greater than the I$^2$C protocol based on the relative frequencies of the first clock signal CLOCK1 and the second clock signal CLOCK2. Accordingly, the frequencies of the clock signals CLOCK1 and CLOCK2 can be configured in any of a variety of ways relative to each other.

As described above in the example of FIG. 1, the transfer of data between the communications controller 52 and the flash memory 56 using the burst read and burst write data transfers can occur with substantially low processor utilization. However, because of the low utilization of the processing resources of the communications controller 52, the communications controller 52 may require an indication of the completion of a given burst read or burst write operation. Specifically, the communications controller 52 does not actively set and monitor address registers to read or write during a respective burst read or a burst write operation. As such, the communications controller 52 may be unable to identify the number of data bytes that have been read or written, and thus may require an indication of the completion of a given burst read or burst write operation.

In the example of FIG. 2, the interface converter 64 includes an output R/W DONE configured to provide an interrupt signal to the communications controller 52 to signify the completion of a burst read or a burst write operation. As an example, the interface converter 64 may include circuitry configured to track a number of data blocks transmitted between the communications controller 52 and the flash memory 56, such that the interface converter 64 can assert the interrupt signal from the R/W DONE output to the communications controller 52 upon transmitting the last data block to or from the communications controller 52. The communications controller 52 includes a general-purpose input/output (GPIO) pin that can be programmed in any of a variety of ways. In the example of FIG. 2, the GPIO pin can be programmed to indicate the completion of the burst read or burst write operation upon receiving the interrupt signal output from the interface converter 64. Therefore, the communications controller 52 can read or write the appropriate number of data blocks during a burst read or burst write operation and maintain low processor utilization.

The communications controller 52 also includes a hardware timer 70, demonstrated in the example of FIG. 2 as HW TIMER. The hardware timer 70 can be configured as an alternative means for providing the indication of the completion of the burst read or the burst write operation. As an example, depending on the application in which the communication system 50 is configured, the GPIO pin of the communications controller 52 may be required for a different purpose. As such, the hardware timer 70 can be used to indicate the completion of the burst read or the burst write operation instead.

The hardware timer 70 can be programmed with a preset time corresponding to an estimated time of completion of the burst read or the burst write operation. In addition, at a time prior to the burst read or the burst write operation, a predefined data pattern is written, to an address register at the end of the consecutive address registers to which the consecutive data blocks are to be written. As an example, the predefined data pattern can be any of a variety of static hexadecimal words, such as 0x00000000 or 0xDEADBEEF, that is recognizable by the communications controller 52. The predefined data pattern can be written to the end address register of the consecutive address registers in the local RAM 54 or in the flash memory 56, as will be explained in greater detail below.

The communications controller 52 activates the hardware timer 70 upon initiating the burst read or the burst write operation. Upon expiration of the hardware timer 70, the communications controller 52 monitors the end address of the consecutive address registers to determine if the predefined data pattern is still stored in the end address. If the predefined data pattern is no longer stored in the end address, then the burst read or burst write operation is complete. If the predefined data pattern is still stored at the end address, the communications controller 52 can extend the preset of the hardware timer 70 and initiate the burst read or the burst write operation again. Thus, the data that is written to the consecutive address registers is overwritten with the data that is read or written in the subsequent burst read or burst write operation.

It is to be understood that the communication system 50 is not intended to be limited to the example of FIG. 2. As an example, the communication system 50 is not intended to be limited to use in a WLAN, but could instead be implemented in a wired LAN or a LAM having a combination of wired and wireless connections. In addition, the communications controller 52 and the interface converter 64 can each include any of a variety of additional I/O that has not been described in the example of FIG. 2 for the sake of simplicity. Also, it is to be understood that the communications controller 52 is not intended to be limited to the I²C protocol, but that the interface converter 64 can be configured to convert any of a variety of bus interface protocols. Furthermore, the flash memory 56 can be configured to store more than just the configuration data 58 and the application parameters 60, such that it can be used to store additional information mat may be pertinent to the communication device in which the communication system 50 is included. Therefore, the communication system 50 can be configured in any of a variety of ways in the example of FIG. 2.

Figure 3:
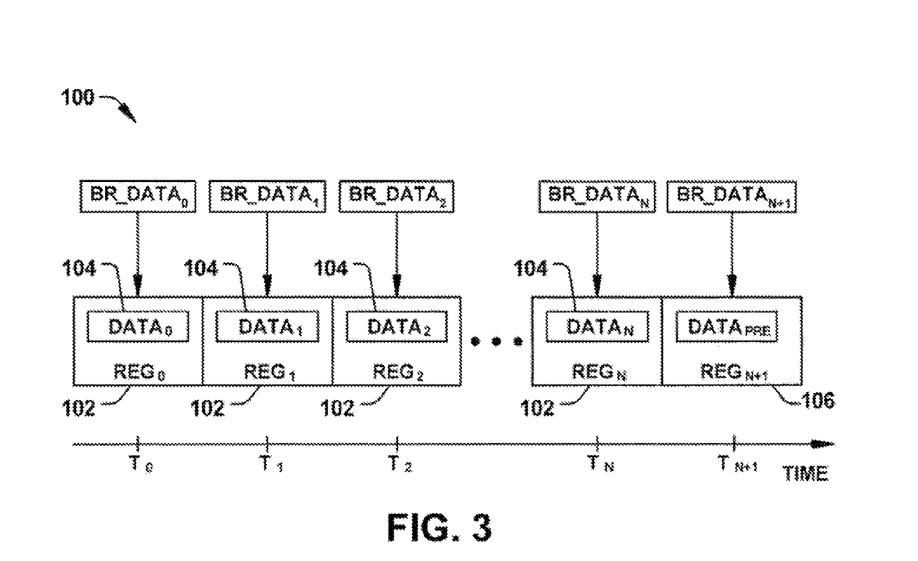
FIG. 3 illustrates an example of a diagram demonstrating a burst read operation in accordance with an aspect of the invention.

FIG. 3 illustrates an example of a diagram 100 demonstrating a burst read operation in accordance with an aspect of the invention. The timing diagram 100 can correspond to a burst read operation of the communication system 50 in the example of FIG. 2. As such, reference is to be made to the communication system 50 in the example of FIG. 2 in the following description of FIG. 3. In addition, it is to be understood that the diagram 100, in the following description, is demonstrated in a conceptual manner for simplicity. Specifically, the data blocks and address registers in the example of FIG. 3 are not intended to be of a specific size/capacity, and are not intended to be uniform in size/capacity relative to each other, such that the data blocks and address registers in the example of FIG. 3 are demonstrated in a conceptual example. Furthermore, in the example of FIG. 3, it is to be assumed that the GPIO pin of the communications controller 52 is not programmed for identifying the completion of the burst read operation.

The diagram 100 includes consecutive address registers 102, demonstrated in the example of FIG. 3 as $REG_0$ through $REG_N$, where N is a positive integer. The address registers 102 can be registers in the local RAM 54 in the communications controller 52. In the example of FIG. 3, each of the address registers 102 includes stored data 104, demonstrated in the example of FIG. 3 as data blocks $DATA_0$ through $DATA_N$. The stored data 104 can correspond to application parameters for a given communications application. In addition, the diagram 100 includes an address register 106 that is a next address register after the address register $REG_N$, and is thus demonstrated in the example of FIG. 3 as $REG_{N+1}$. The address register 106 includes a predefined data pattern $DATA_{PRE}$. As an example, the predefined data pattern $DATA_{PRE}$ can include any of a variety of data patterns recognizable by the communications controller 52. In addition, the predefined data pattern $DATA_{PRE}$ could have been written to the address register 106 at a previous time, such as directly after a previous burst read operation in which the data blocks $DATA_0$ through $DATA_N$ were read to the address registers 102.

In the burst read operation demonstrated by the example of FIG. 3, a plurality of consecutive data blocks BR_DATA are read to the address registers 102. The consecutive data blocks BR_DATA can include application parameters, such as the application parameters 60 in the example of FIG. 2, thus corresponding to a different communications application than that represented by the stored data 104. At a time $T_0$, a first burst read data block $BR\_DATA_0$ is read to the address register $REG_0$. The first burst read data block $BR\_DATA_0$, when read to the address register $REG_0$, overwrites the data block $DATA_0$ that has been stored in the address register $REG_0$. In a similar manner, at a time $T_1$, a second burst read data block $BR\_DATA_1$ is read to the address register $REG_1$. At a time $T_2$, a third burst read data block $BR\_DATA_2$ is read to the address register $REG_2$, and so forth, until a time $T_N$ at which an $N^{th}$ burst read data block $BR\_DATA_N$ is read to the address register $REG_N$.

As described above in the example of FIG. 2, the communications controller 52 does not actively set and monitor address registers to read during a respective burst read operation. Therefore, the burst read operation demonstrated in the example of FIG. 3 may continue past the time $T_N$, as the communications controller 52 may not have been able to identify the completion of the burst read operation absent the interrupt signal provided to the GPIO pin from the interface converter 64. Accordingly, at a time $T_{N+1}$, the address register 106 reads a burst read data block $BR\_DATA_{N+1}$. The burst read data block $BR\_DATA_{N+1}$ can be "don't, care" data, such that it was dummy data in the next consecutive address register of the application parameters 60 after the $N^{th}$ burst read data block $BR\_DATA_N$ in the flash memory 56. The predefined data pattern $DATA_{PRE}$ is thus written over by the burst read data block $BR\_DATA_{N+1}$.

Upon expiration of the preset in the hardware timer 70, the communications controller 52 checks the contents of the address register 106. If the preset is set such that the expiration of the hardware timer 70 occurs subsequent to the time $T_{N+1}$, then the communications controller 52 determines that the predefined data pattern $DATA_{PRE}$ is no longer stored in the address register 106. Therefore, the communications controller 52 identifies that the burst read operation has been completed. Accordingly, subsequent to the completion of the burst read operation, the communications controller 52 can write the predefined data $DATA_{PRE}$ back into the address register 106 for use in the next burst read operation.

It is to be understood that the diagram 100 is not intended to be limited to the above description of the example of FIG. 3. As such, the burst read operation can be implemented in any of a variety of ways. In addition, the diagram 100 can similarly describe a burst write operation, such that the address registers 102 and 106 can be address registers that are included in the flash memory 56.

Figure 4:
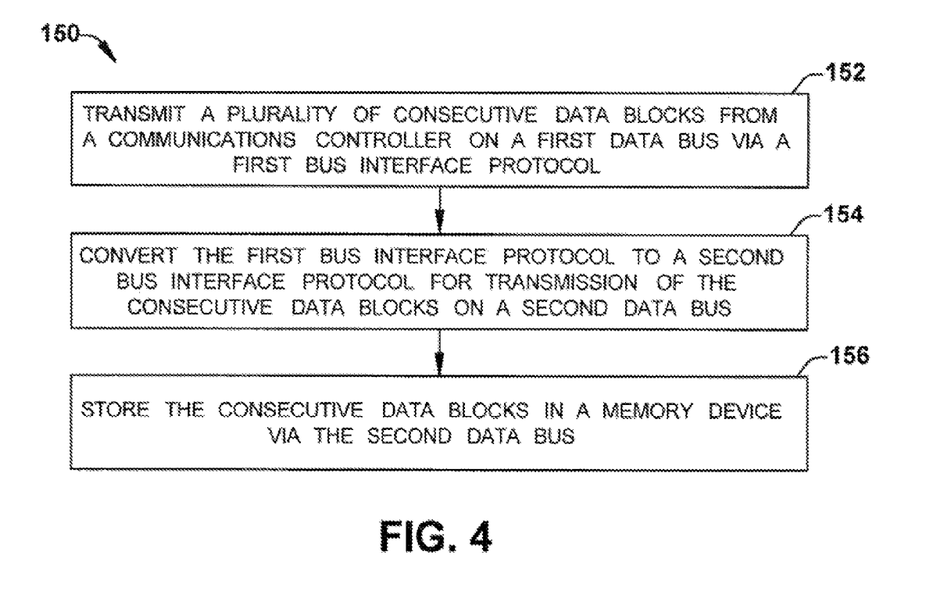
FIG. 4 illustrates an example of a method for performing a burst read/write operation in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit or a computer system), software (e.g., as executable instructions stored on a computer readable media or running on one or more computer systems), or any combination of hardware and software.

FIG. 4 illustrates an example of a method 150 for communicating with a memory device in accordance with an aspect of the invention. At 152, a plurality of consecutive data blocks are transmitted from a communications controller on a first data bus via a first bus interface protocol. The communications controller can be a communications processor in a communication device configured to operate in a WLAN. The data that is transmitted can be application parameters that correspond to a given communications application being run by the communications controller. The first data bus can be a serial-bus, and the first bus interface protocol can be $I^2C$ protocol.

At 154, the first bus interface protocol is converted to a second bus interface protocol for transmission of the plurality of consecutive data blocks on a second data bus. The second data bus can be a parallel-bus. The conversion of the bus interface protocols can be implemented by an interface converter, which could be a separate IC from the communications controller. At 156, the plurality of consecutive data blocks are stored in the memory device via the second data bus. The memory device can be a flash memory, and the consecutive data blocks can be stored in consecutive address registers in the flash memory.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims

What is claimed is:

1. A communication system comprising:
a communications controller configured to control transmission and reception of communications data in a network, wherein the communications controller comprises a timer having a preset corresponding to an estimated time of completion of at least one of the burst read data transfer and the burst write data transfer;
a first memory configured to store configuration data associated with the communications controller and application parameters associated with each of a plurality of communications applications; and
an interface converter interconnecting the communications controller and the first memory and configured to convert a first bus interface protocol associated with the communications controller to a second bus interface protocol for providing read and write data transfer of the configuration data and the application parameters between the communications controller and the first memory, wherein the read and write data transfer comprises a burst read data transfer and a burst write data transfer of a plurality of consecutive data blocks associated with the configuration data and application parameters between the communications controller and the first memory via the interface converter and wherein the communications controller is further configured to write a predefined data pattern in an end address of consecutive address registers in an address space associated with the one of the communications controller and the first memory to which the plurality of consecutive data blocks are transferred.

2. The system of claim 1, wherein the first bus interface protocol is inter-integrated circuit ($I^2C$) protocol.

3. The system of claim 1, wherein the first memory comprises a flash memory.

4. The system of claim 1, wherein the communications controller comprises a local memory, the burst read data transfer comprising the plurality of consecutive data blocks being transmitted from the first memory to the local memory, such that consecutive address registers in the local memory are overwritten by the plurality of consecutive data blocks.

5. The system of claim 1, wherein the interface converter is further configured to provide an interrupt signal to the communications controller to indicate a completion of at least one of the burst read data transfer and the burst write data transfer.

6. The system of claim 1, wherein the communications controller, upon expiration of the preset, determines if the predefined data pattern has been written over to signify a completion of the at least one of the burst read data transfer and the burst write data transfer, and wherein the communications controller sets the preset for a longer estimated time upon the predefined data pattern having not been written over.

7. A network communications device comprising the system of claim 1.

8. A method for communicating with a memory device, the method comprising:
- transmitting a plurality of consecutive data blocks from a communications controller on a first data bus via inter-integrated circuit ($I^2C$) protocol;
- converting the $I^2C$ protocol to a second bus interface protocol for transmission of the plurality of consecutive data blocks on a second data bus;
- storing the plurality of consecutive data blocks in the memory device via the second data bus;
- writing a predefined data pattern at an end address register of a plurality of address registers in the memory device;
- setting a preset time associated with a timer corresponding to an estimated time of completion of the transmission of the plurality of consecutive data blocks from the communications controller;
- incrementing the timer; and
- monitoring the end address register in the memory device upon the timer reaching the preset time to indicate a completion of the transmission of the plurality of consecutive data blocks from the communications controller.

9. The method of claim 8, wherein transmitting the plurality of consecutive data blocks comprises transmitting application parameters associated with a respective one of a plurality of communications applications corresponding to one of transmission and reception of communications data via the communications controller.

10. The method of claim 8, further comprising generating an interrupt signal to the communications controller to indicate a completion of the transmission, of the plurality of consecutive data blocks from the communications controller.

11. The method of claim 8, further comprising increasing the preset time upon the address register in the memory device storing the predefined data pattern upon monitoring the address register in the memory device.

12. The method of claim 8, further comprising:
- transmitting a second plurality of consecutive data blocks from the memory device on the second data bus via the second bus interface protocol;
- converting the second bus interface protocol to the $I^2C$ protocol for transmission of the second plurality of consecutive data blocks on the first data bus; and
- overwriting stored data in a memory space associated with the communications controller with the second plurality of consecutive data blocks.

13. The method of claim 12, wherein transmitting the second plurality of consecutive data blocks comprises transmitting at least one of configuration data associated with the communications controller and application parameters associated with a respective one of the plurality of communications applications.

14. A communication system comprising:
- means for controlling transmission and reception of communications data in a network, comprising:
  - means for initiating the read data transfer as a burst read data transfer and the write data transfer as a burst write data, such that each of the configuration data and the application parameters are configured as a plurality of consecutive data blocks that are sequentially transmitted between the means for controlling and the means for storing;
  - means for completing the burst read data transfer and the burst write data transfer based on one of a means for generating an interrupt signal;
  - means for writing a predefined data pattern into an end address register of a plurality of consecutive address registers;
- means for storing configuration data associated with the means for controlling and for storing application parameters associated with each of a plurality of communications applications; and
- means for converting a first bus interface protocol associated with the communications controller to a second bus interface protocol for providing read data transfer of the configuration data and the application parameters from the means for storing to the means for controlling and write data transfer of the application parameters from the means for controlling to the means for storing;
- means for timing the burst read data transfer and the burst write data transfer, comprising means for determining the presence of the predefined data pattern upon completion of a time associated with one of the burst read data transfer and the burst write data transfer.

* * * * *